United States Patent
Fukumura

(10) Patent No.: US 6,510,324 B2
(45) Date of Patent: *Jan. 21, 2003

(54) WIRELESS TELEPHONE APPARATUS

(75) Inventor: Ryoichi Fukumura, Kasuga (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,814

(22) Filed: Oct. 27, 1998

(65) Prior Publication Data

US 2001/0041585 A1 Nov. 15, 2001

(30) Foreign Application Priority Data

Oct. 27, 1997 (JP) .............................. 9-293881

(51) Int. Cl.$^7$ .............................. H04B 1/38; H04Q 7/20; H04J 1/02
(52) U.S. Cl. ...................... 455/550; 455/566; 455/426; 370/493
(58) Field of Search .................. 455/556, 557, 455/426, 406, 458, 566, 414, 552, 553, 550; 370/493, 494, 495

(56) References Cited

U.S. PATENT DOCUMENTS

| | | | | | |
|---|---|---|---|---|---|
| 5,327,479 A | * | 7/1994 | Engelke et al. | ................ | 379/52 |
| 5,583,921 A | * | 12/1996 | Hidaka | ........................ | 379/93 |
| 5,594,740 A | * | 1/1997 | LaDue | ........................ | 379/59 |
| 5,740,531 A | * | 4/1998 | Okada | ........................ | 455/403 |
| 5,749,052 A | * | 5/1998 | Hidem et al. | ................ | 455/406 |
| 5,797,089 A | * | 8/1998 | Nguyen | ........................ | 455/403 |
| 5,890,073 A | * | 3/1999 | Fukawa | ........................ | 455/557 |
| 5,995,500 A | * | 11/1999 | Ma et al. | ..................... | 370/337 |
| 6,061,570 A | * | 5/2000 | Janow | ........................ | 455/458 |
| 6,061,718 A | * | 5/2000 | Nelson | ........................ | 709/206 |
| 6,112,084 A | * | 8/2000 | Sicher et al. | ................ | 455/426 |
| 6,205,322 B1 | * | 3/2001 | Muramatsu | ................. | 455/31.2 |

* cited by examiner

Primary Examiner—Nguyen T. Vo
Assistant Examiner—Duc Nguyen
(74) Attorney, Agent, or Firm—RatnerPrestia

(57) ABSTRACT

The control unit of a wireless telephone apparatus includes transmission and reception control unit for controlling both transmission processor and reception processor, and received sound wave analyzing unit or data communication unit, so that character information can be simultaneously sent or received between wireless telephone apparatuses capable of making a call or data communication.

30 Claims, 15 Drawing Sheets

WIRELESS TELEPHONE APPARATUS

BACKGROUND OF THE INVENTION

The present invention relates to a wireless telephone apparatus for realizing wireless communication.

Recently, the wireless telephone apparatus comes to send and receive various data, in addition to talking.

A conventional wireless telephone apparatus is explained below while referring to the drawing. FIG. 1 is a block diagram showing a constitution necessary for talking and communicating data in a conventional wireless telephone apparatus. In FIG. 1, reference numeral 2 of the wireless telephone apparatus 1 is an antenna, 3 is a wireless unit, 14 is a control unit, 5 is a display unit, 6 is an input operation unit, 7 is an external data input/output unit, and 8 is a data transmitter/receiver.

In thus constituted conventional wireless telephone apparatus, the operation is described below.

When the wireless telephone apparatus 1 is set in call enable state by outgoing operation and character information for sending a remote telephone apparatus is entered from the input operation unit 6 in order to send character information to the remote telephone apparatus, a transmission processor 14b of the control unit 14 displays the entered character information in the display unit 5, and the transmission processor 14b of the control unit 14 converts the entered character information into wireless signals by controlling the wireless means 3a of the wireless unit 3, and transmits to the remote telephone apparatus through the antenna 2. Or, when the wireless telephone apparatus 1 is set in call enable state by incoming, and character information is received from a remote telephone apparatus, a reception processor 14a of the control unit 14 controls the wireless means 3a and received sound waveform analyzing means 3b of the wireless means 3, converts the received wireless signals into sound waves, analyzes the signal of the character information contained in the sound waves, and displays the character information in the display unit 5. Moreover, by the data transmitter/receiver 8 having data communication means 8a, when the wireless telephone apparatus 1 is set in data communication enable state, and digital data is sent from the external data input/output unit 7, the transmission processor 14b of the control unit 14 converts into wireless signals through the wireless means 3a of the wireless unit 3, and transmits. When the wireless signals received through the antenna 2 are converted into digital data through the wireless means 3a of the wireless unit 3, the reception processor 14a of the control unit 14 sends the digital data from the external data input/output unit 7 to the data transmitter/receiver 8.

In this conventional wireless telephone apparatus, however, when sending or receiving data information in the call enable state, either transmission or reception only can be done, and an ordinary telephone apparatus incapable of sending and receiving data in two directions in call enable state may be provided with a chat function or the like so as to communication in two ways through a server or the like of a certain provider in the midst of communication, but it requires a contract with the service provider, and the charge aside from the call charge is claimed. As a matter of course, such communication is not possible unless the remote station is also contracting with the same chat provider. In the case of the chat, still more, the user must first call the chat provider to connect with the server for the chat service, and then call the remote station, and the remote state must do the same.

Generally, a merit of wireless telephone apparatus is to use easily when the user is away from home, and the service is expanding owing to this merit, and it is very troublesome to do such procedure while moving or away from home to make two-way communications, and it is not practicable.

SUMMARY OF THE INVENTION

In the light of the above problems of the prior art, it is an object of the invention to present a wireless telephone apparatus a realizing two-way communications between one wireless telephone apparatus and other telephone apparatus easily and without requiring complicated function such as the aforesaid chat, in which two-way control is possible by controlling transmission of data entered from input means during one wireless call, and controlling to display the received data, and in this constitution, data can be send and received directly between two wireless telephone apparatuses set in call or data communication enable state, and connection to the server and contract with the provider are enabled.

DESCRIPTION OF THE PREFERRED EMBODIMENTS

Referring, to FIG. 2 through FIG. 15, plural embodiments of the invention are described below.

(First embodiment)

Figure 1:
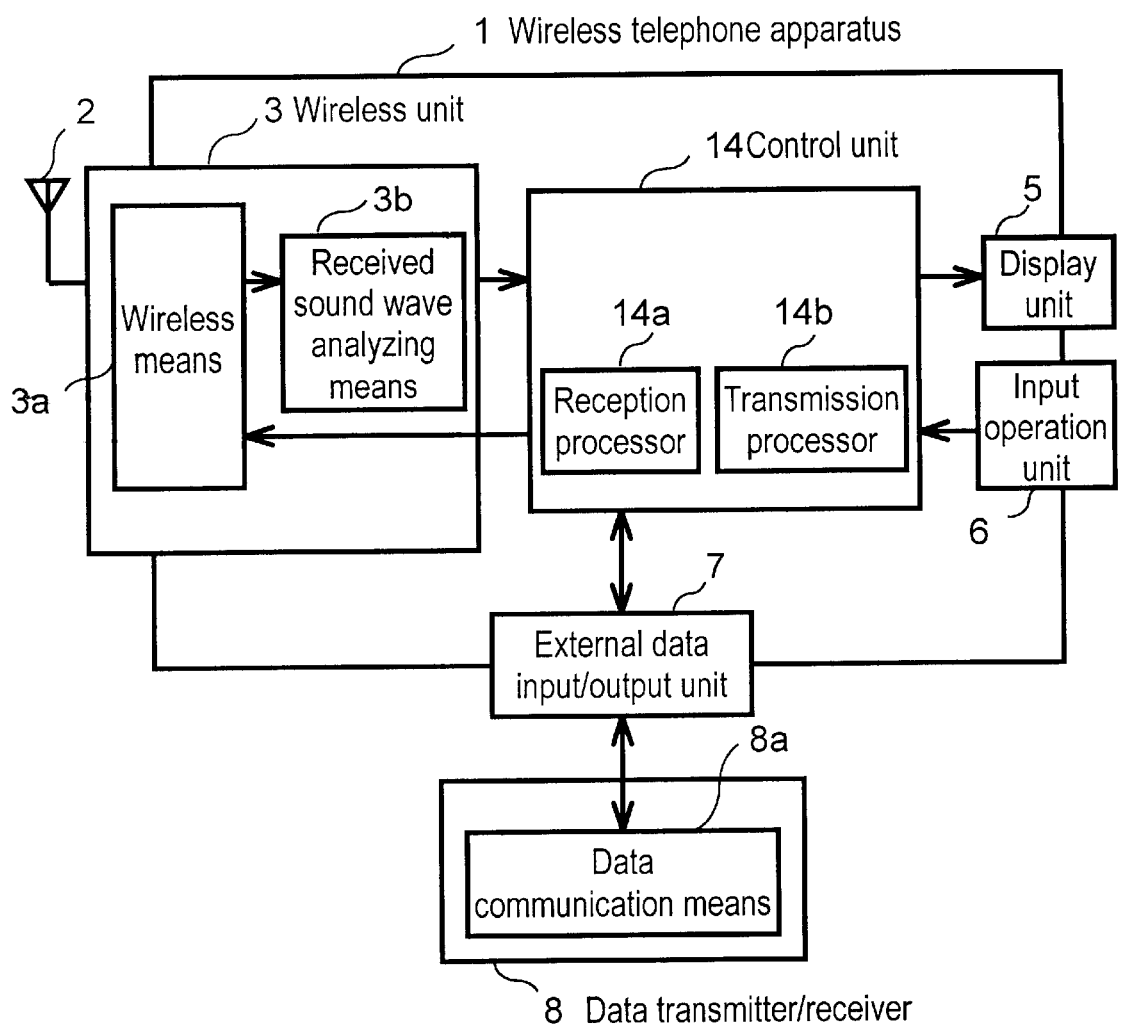
FIG. 1 is a block diagram composing a control unit necessary for call and data communication in a conventional wireless telephone apparatus.
Figure 2:
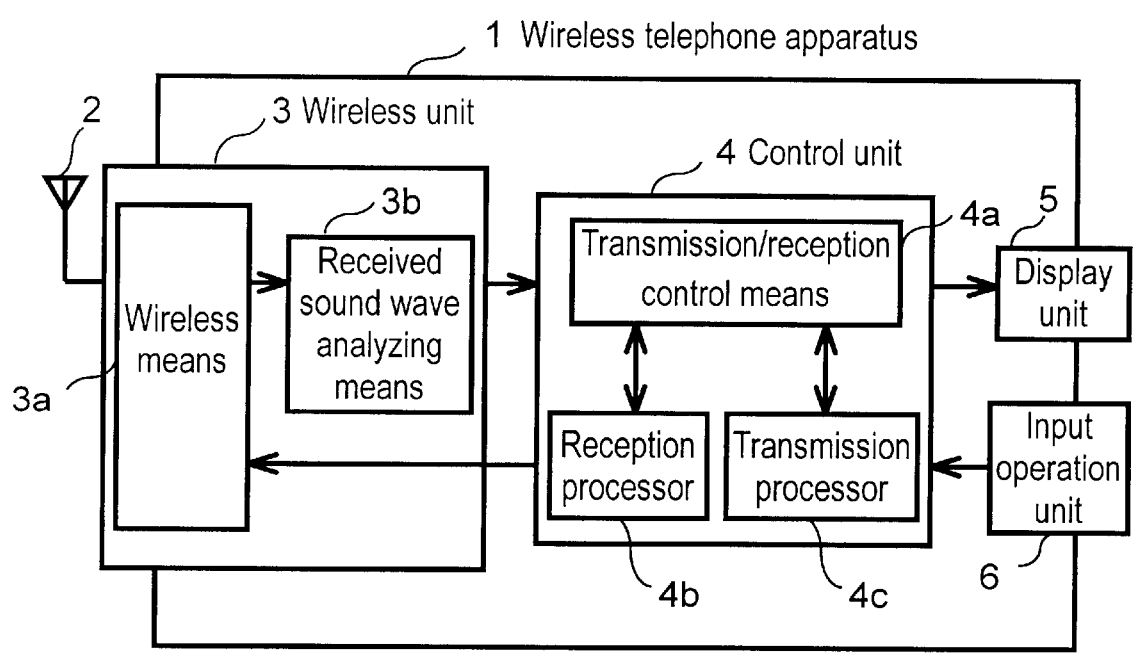
FIG. 2 is a block diagram composing a wireless telephone apparatus in a first embodiment of the invention.
Figure 3:
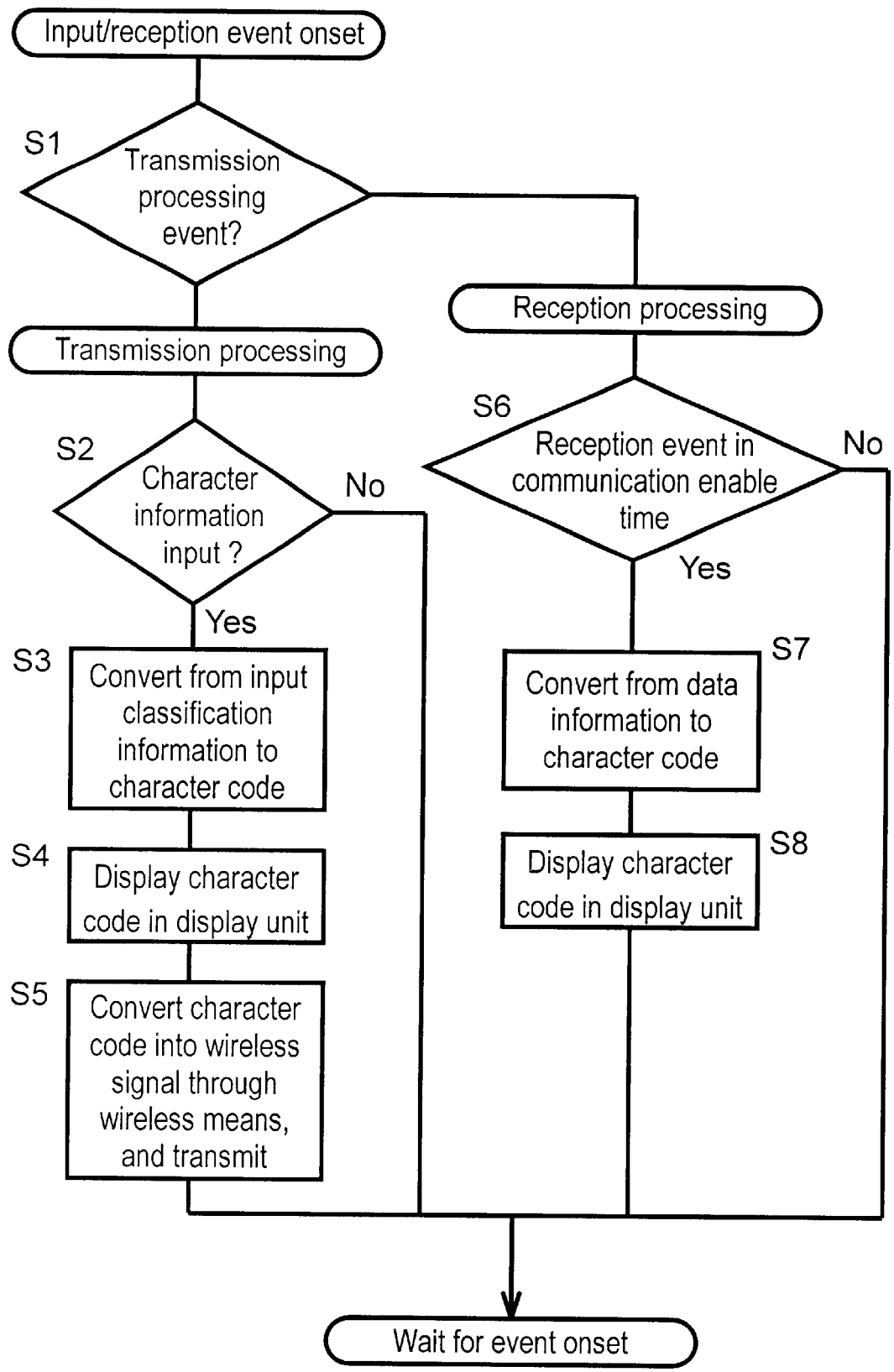
FIG. 3 is a flowchart showing an operation example of character information transmission and reception in call enable state of the wireless telephone apparatus in the first embodiment of the invention.

FIG. 2 is a block diagram composing a wireless telephone apparatus in a first embodiment of the invention, and FIG. 3 is a flowchart showing an operation example of character information transmission and reception in call enable state of the wireless telephone apparatus in the first embodiment of the invention.

The operation of the wireless telephone apparatus in call enable state for sending and receiving character information is described below by reference to FIG. 2 and FIG. 3. After the wireless telephone apparatus 1 is set in call enable state, when an input is entered from the input operation unit 6 of the wireless telephone apparatus 1, the control unit 4 of the invention generates an input event (this event includes input classification information) of the input operation unit 6 showing that an input is made to the input operation unit 6 of the wireless telephone apparatus 1. Transmission/reception control means 4a of the control unit 4 of the invention judges the generated event (S1), and when the input classification information of the input event of the input operation unit 6 is character information input (S2), transmission processor 4c converts from the input classification information of the input event of the input operation unit 6 to character code (S3), this character code is displayed in the display unit 5 (S4), and this character code is converted into wireless signal and transmitted through the wireless means 3a of the wireless unit 3 (S5), thereby waiting for event onset. When the wireless telephone apparatus 1 receives a wireless signal, the received wireless signal is converted to sound wave data by the wireless means 3a in the wireless unit 3, and the signal contained in the sound wave data is analyzed by the sound wave analyzing means 3b, and when it is a signal that can be recognized by the wireless telephone apparatus 1, the control unit 4 generates a reception event in call enable time (this event includes signal information that can be recognized by the wireless telephone apparatus 1). The transmission/reception control means 4a of the control unit 4 judges the generated event (S1), and when the event of the reception processor 4b is the reception event in call enable time (S6), the signal information contained in this event is converted to character code (S7), and this character code is displayed in the display unit 5 (S8), thereby waiting for event onset.

The sound wave data used in the embodiment is, for example, a tone signal.

In particular, in this tone signal, when DTMF (dual tone multiple frequency) signal used in ordinary analog telephone circuit is utilized, the data communication means can make use of the technology of the DTMF output unit and DTMF receiver used in general telephone apparatus, and special tone signal communication means is not necessary.

(Second embodiment)

Figure 4:
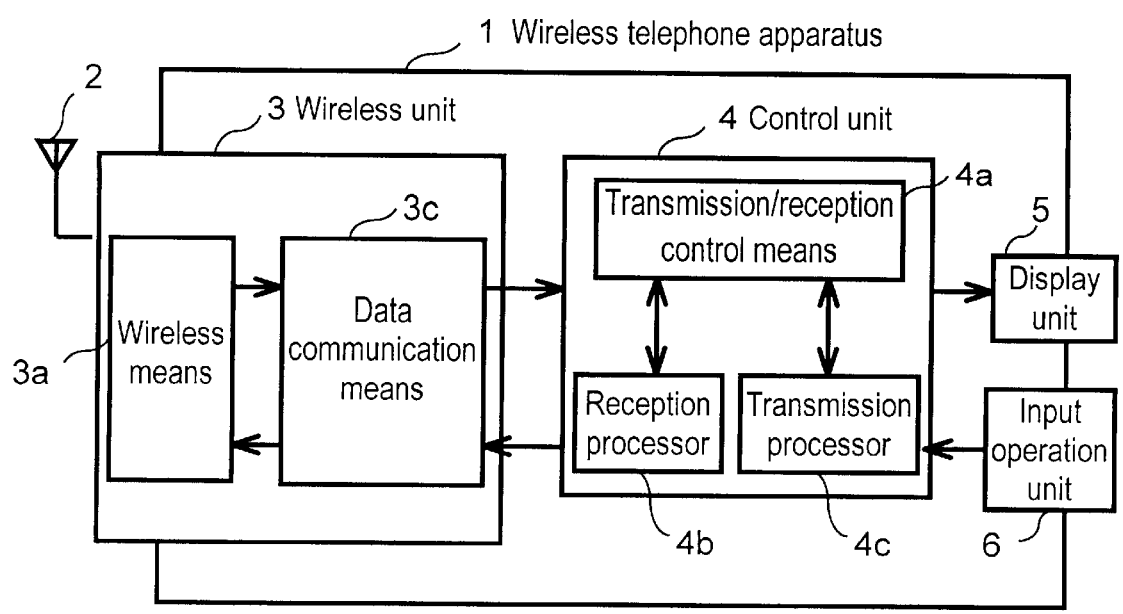
FIG. 4 is a block diagram composing a wireless telephone apparatus in a second embodiment of the invention.
Figure 5:
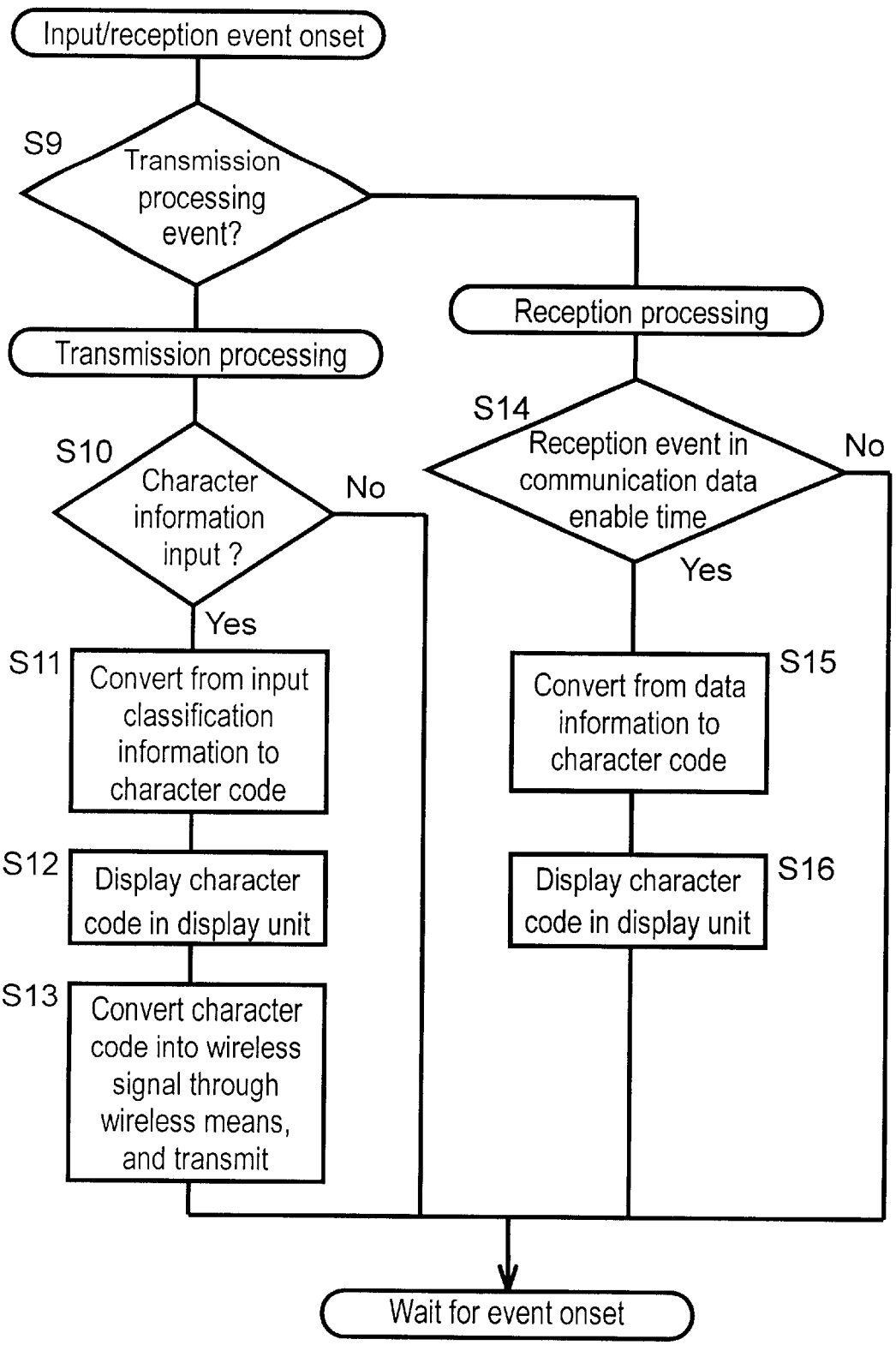
FIG. 5 is a flowchart showing an operation example of character information transmission and reception in data communication enable state of the wireless telephone apparatus in the second embodiment of the invention.

FIG. 4 is a block diagram composing a wireless telephone apparatus in a second embodiment of the invention, and FIG. 5 is a flowchart showing an operation example of character information transmission and reception in data communication enable state of the wireless telephone apparatus in the second embodiment of the invention.

The operation of the wireless telephone apparatus in data communication enable state for sending and receiving character information is described below by reference to FIG. 4 and FIG. 5. After the wireless telephone apparatus 1 is set in data communication enable state, when an input is entered from the input operation unit 6 of the wireless telephone apparatus 1, the control unit 4 of the invention generates an input event (this event includes input classification information) of the input operation unit 6 showing that an input is made to the input operation unit 6 of the wireless telephone apparatus 1. The transmission/reception control means 4a of the control unit 4 of the invention judges the generated event (S9), and when the input classification information of the input event of the input operation unit 6 is character information input (S10), the transmission processor 4c converts from the input classification information of the input event of the input operation unit 6 to character code (S11), this character code is displayed in the display unit 5 (S12), and this character code is converted into wireless signal and transmitted through the wireless means 3a and data communication means 3c of the wireless unit 3 (S13), thereby waiting for event onset. When the wireless telephone apparatus 1 receives a wireless signal, digital data is extracted from the received wireless signal by the wireless means 3a and data communication means 3c in the wireless unit 3, and the control unit 4 generates a reception event in data communication enable time (this event includes the extracted digital data information.) The transmission/reception control means 4a of the control unit 4 judges the generated event (S9), and when the event of the reception processor 4b is the reception event in data communication enable time (S14), the digital data contained in this event is converted to character code (S15), and this character code is displayed in the display unit 5 (S16), thereby waiting for event onset.

When transmission and reception of the digital data conform to the standard format of PIAFS (Personal Handyphone Internet Access Forum), which is one of data communication standards of PHS (Personal Handyphone System: second-generation cordless telephone), the portion of the data communication means can make use of the technology of the data communication means corresponding to the PIAFS used in ordinary telephone apparatus, and hence special data tone signal communication means is not necessary.

(Third embodiment)

Figure 6:
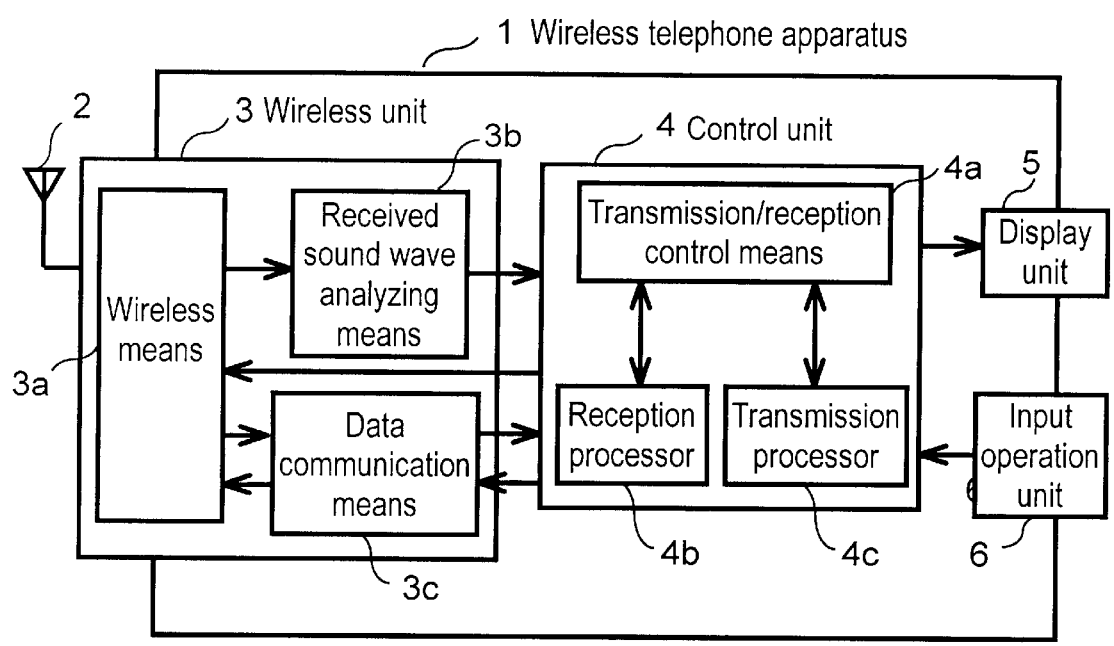
FIG. 6 is a block diagram composing a wireless telephone apparatus in a third embodiment of the invention.
Figure 7:
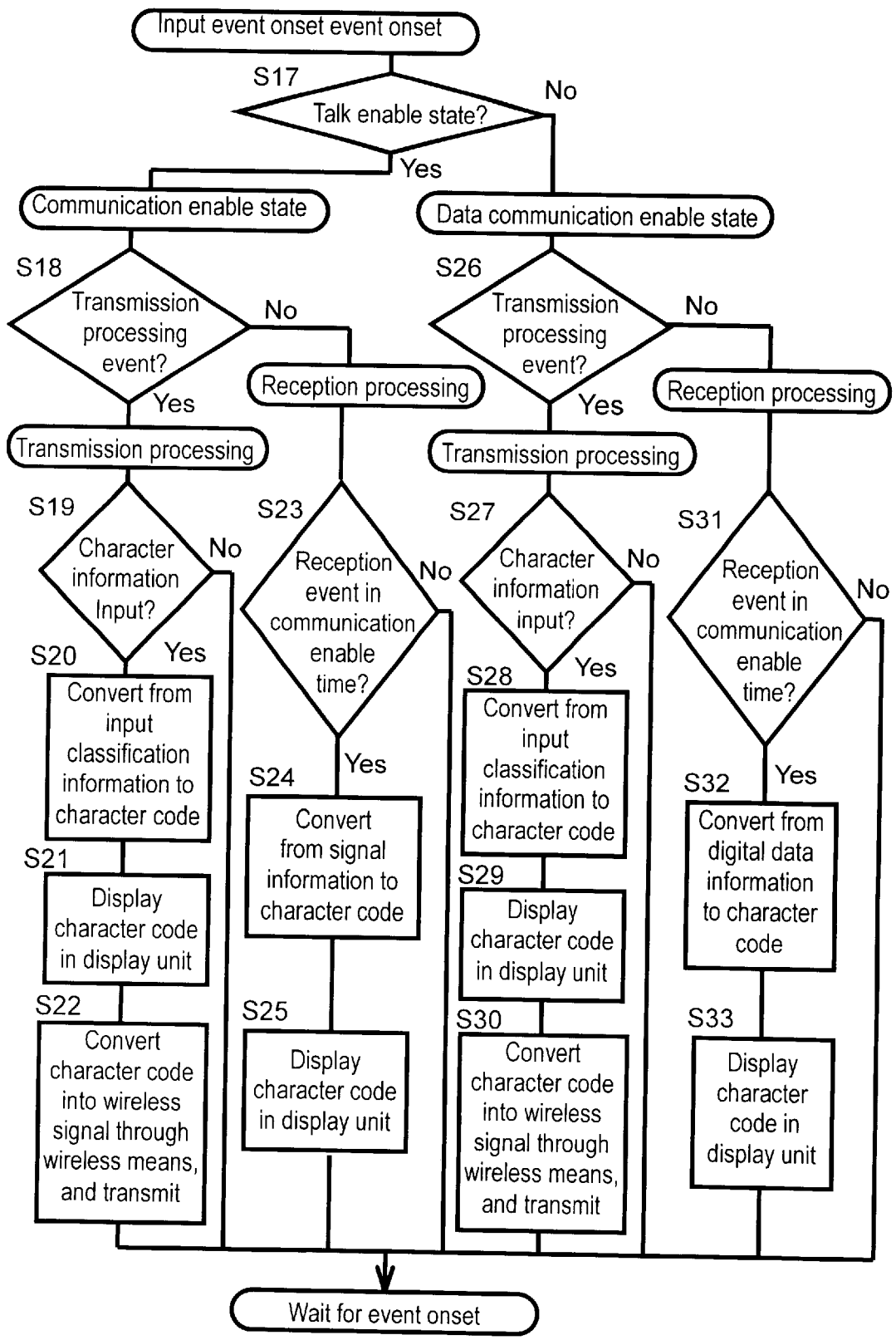
FIG. 7 is a flowchart showing an operation example of character information transmission and reception in call or data communication enable state of the wireless telephone apparatus in the third embodiment of the invention.

FIG. 6 is a block diagram composing a wireless telephone apparatus in a third embodiment of the invention, and FIG. 7 is a flowchart showing an operation example of character information transmission and reception in call or data communication enable state of the wireless telephone apparatus in the third embodiment of the invention.

The operation of the wireless telephone apparatus in call or data communication enable state for sending and receiving character information is described below by reference to FIG. 6 and FIG. 7. With the wireless telephone apparatus 1 being set in call or communication enable state, when an input is entered from the input operation unit 6 of the wireless telephone apparatus 1, the control unit 4 of the invention generates an input event (this event includes input classification information) of the input operation unit 6 showing that an input is made to the input operation unit 6 of the wireless telephone apparatus 1. The transmission/reception control means 4a of the control unit 4 of the invention judges whether the present transmission and reception state is a call enable state (S17), and the call enable state is judged. The transmission/reception control means 4a of the control unit 4 of the invention judges the generated event (S18), and when the input classification information of the input event of the input operation unit 6 is character information input (S19), the transmission processor 4c converts from the input classification information to character code (S20), this character code is displayed in the display unit 5 (S21), and this character code is converted into wireless signal and transmitted through the wireless means 3a of the wireless unit 3 (S22), thereby waiting for event onset. When the wireless telephone apparatus 1 receives a wireless signal in call enable state, the received wireless signal is converted to sound wave data by the wireless means 3a in the wireless unit 3, and the signal contained in the sound wave data is analyzed by the sound wave analyzing means 3b, and when it is a signal that can be recognized by the wireless telephone apparatus 1, the control unit 4 generates a reception event in call enable time (this event, includes signal information that can be recognized by the wireless telephone apparatus 1). The transmission/reception control means 4a of the control unit 4 of the invention judges whether the present transmission and reception state is a call enable state (S17), and the call enable state is judged. The transmission/reception control means 4a of the control unit 4 of the invention judges the generated event (S18), and when the event generated in the reception processor 4b is the reception event in call enable time (S23), the signal information contained in this event is converted to character code (S24), and this character code is displayed in the display unit 5 (S25), thereby waiting for event onset.

With the wireless telephone apparatus 1 being set in data communication enable state, when an input is entered from the input operation unit 6 of the wireless telephone apparatus 1, the control unit 4 of the invention generates an input event (this event includes input classification information) of the input operation unit showing that an input is made to the input operation unit 6 of the wireless telephone apparatus 1. The transmission/reception control means 4a of the control unit 4 of the invention judges whether the present transmission and reception state is a call enable state (S17), and the data communication enable state is judged. The transmission/reception control means 4a of the control unit 4 of the invention judges the generated event (S26), and when event of the transmission processor 4c is the input event of the input operation unit 6 (S27), the input classification information of the input event of the input operation unit 6 is converted to character code (S28), this character code is displayed in the display unit 5 (S29), and this character code is converted into wireless signal and transmitted through the wireless means 3a and data communication means 3c of the wireless unit 3 (S30), thereby waiting for event onset. In the data communication enable state, when the wireless telephone apparatus 1 receives a wireless signal, digital data is extracted from the wireless signal by the wireless means 3a and data communication means 3c in the wireless unit 3, and the control unit 4 generates a reception event in data communication enable time (this event includes the extracted digital data information.) The transmission/reception control means 4a of the control unit 4 of the invention judges whether the present transmission and reception state is a call enable state (S17), and the data communication enable state is judged. The transmission/reception control means 4a of the control unit 4 of the invention judges the generated event (S26), and when the event of the reception processor 4b is the reception event in data communication enable time (S31), the digital data contained in this event is converted to character code (S32), and this character code is displayed in the display unit 5 (S33), thereby waiting for event onset.

Thus, when both digital and analog communications are possible, whether the remote station is making analog communication or digital communication, data communication is realized.

As a matter of course, as mentioned in the first embodiment, the sound wave data used in the embodiment includes, for example, a tone signal, and in this tone signal, when DTMF signal used in ordinary analog telephone circuit is utilized, the data communication means can make use of the technology of the DTMF output unit and DTMF receiver used in general telephone apparatus, and special tone signal communication means is not necessary.

Also as mentioned in the second embodiment, when transmission and reception of the digital data conform to the standard format of PIAFS (Personal Handyphone Internet Access Forum), which is one of data communication standards of PHS (Personal Handyphone System: second-generation cordless telephone), the portion of the data communication means can make use of the technology of the data communication means corresponding to the PIAFS used in ordinary telephone apparatus, and hence special data tone signal communication means is not necessary.

(Fourth embodiment)

Figure 8:
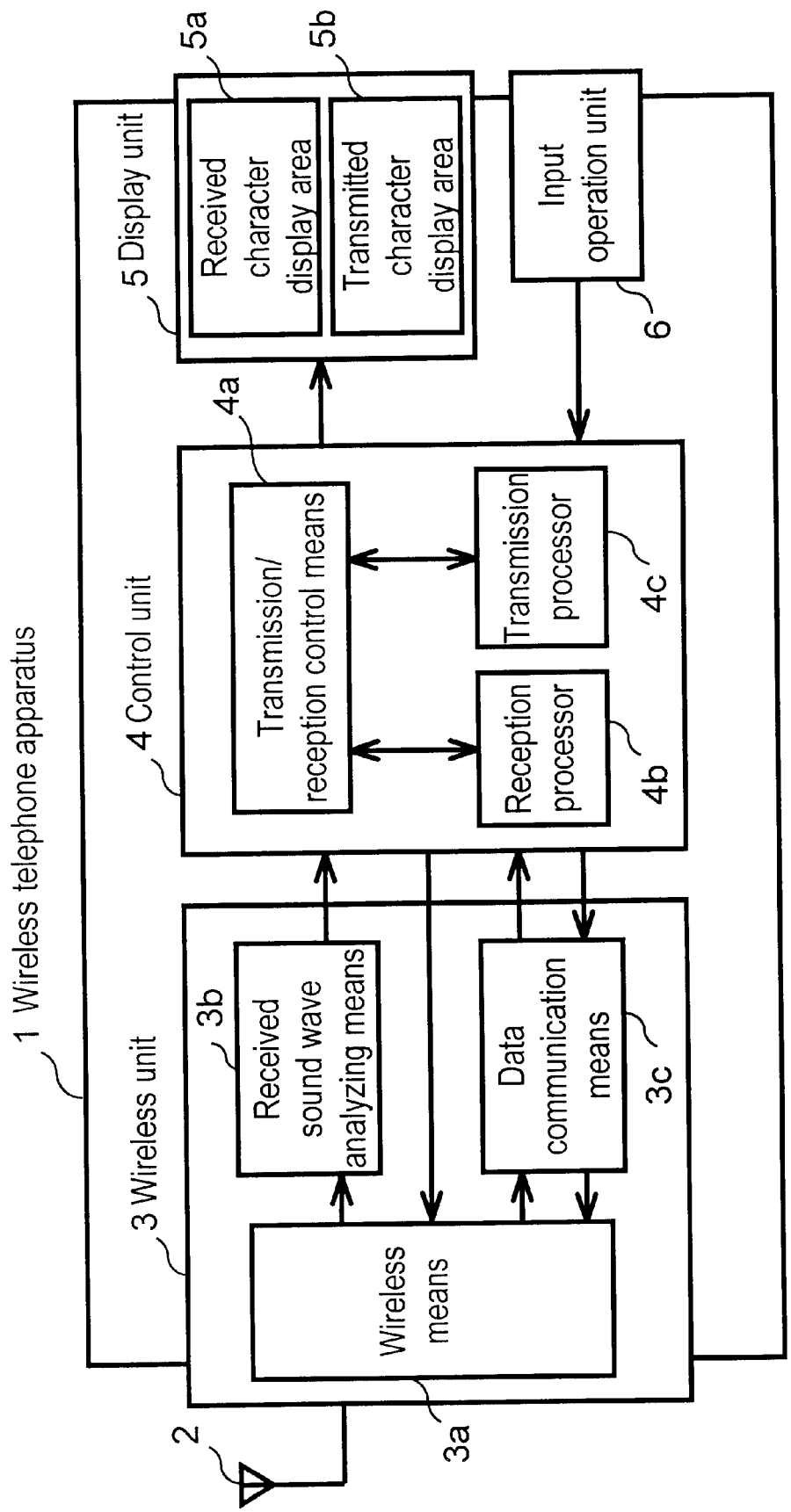
FIG. 8 is a block diagram composing a wireless telephone apparatus in a fourth embodiment of the invention.
Figure 9:
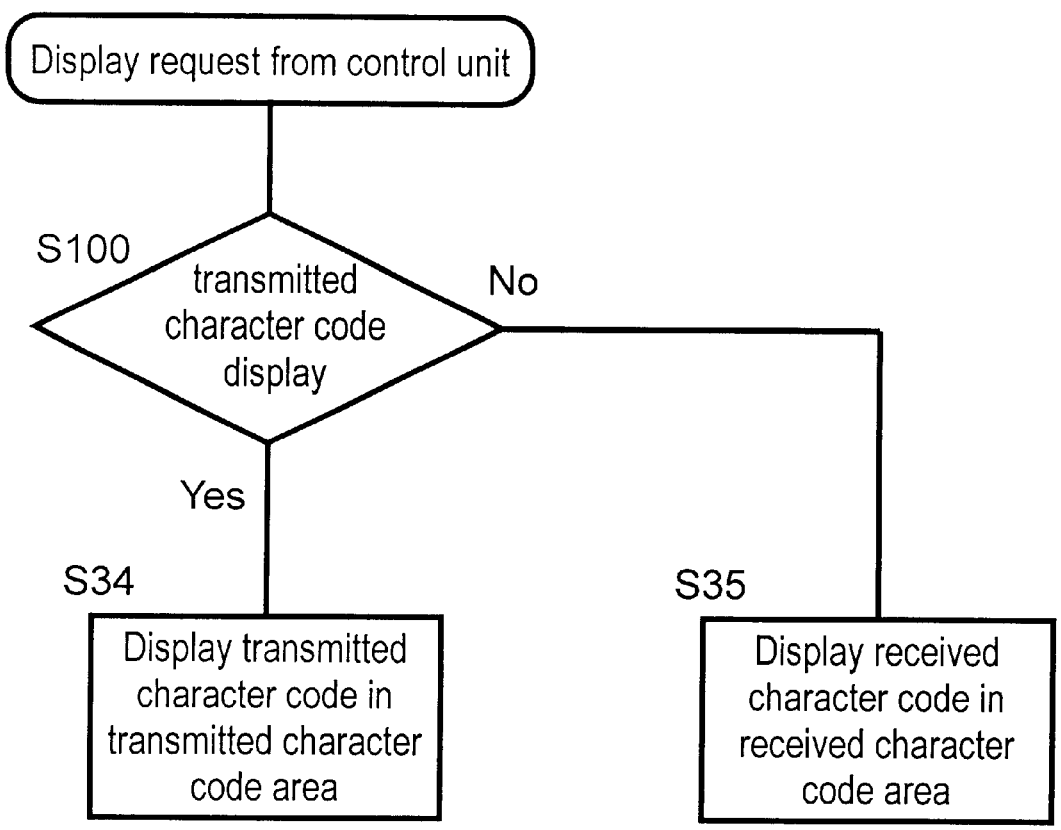
FIG. 9 is a flowchart showing an operation example of character information transmission and reception in call or data communication enable state of the wireless telephone apparatus in the fourth embodiment of the invention.

FIG. 8 is a block diagram composing a wireless telephone apparatus in a fourth embodiment of the invention, and FIG. 9 is a flowchart showing an operation example of character information transmission and reception in call or data communication enable state of the wireless telephone apparatus in the fourth embodiment of the invention.

The operation of the wireless telephone apparatus in call or data communication enable state for sending and receiving character information is described below by reference to FIG. 8 and FIG. 9. With the wireless telephone apparatus 1 being set in call or data communication enable state, when the control unit 4 of the invention requests display of character code to be transmitted to the display unit 5 (S100), the character code to be transmitted is displayed in the transmission character code display area of the display unit 5 (S34). When the control unit 4 of the invention requests display of character code converted after reception in the display unit 5, the character code converted after reception is displayed in the reception character code display area 5a of the display unit 5 (S35).

(Fifth embodiment)

Figure 10:
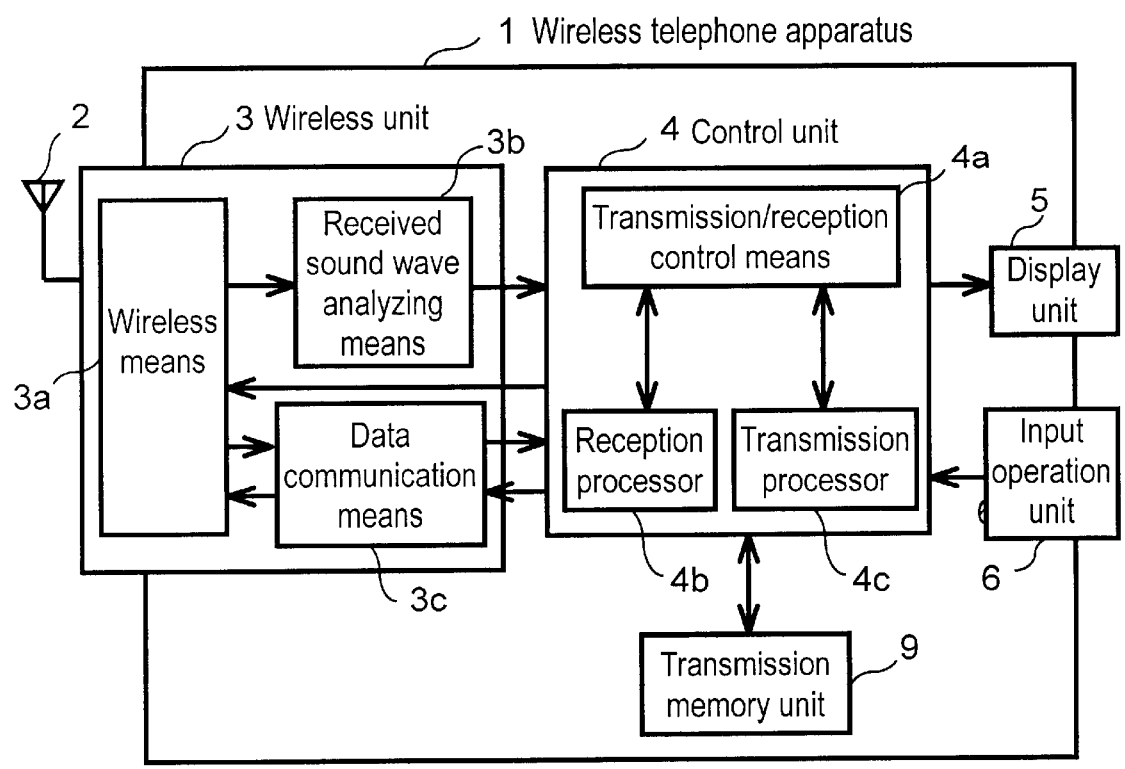
FIG. 10 is a block diagram composing a wireless telephone apparatus in a fifth embodiment of the invention.
Figure 11:
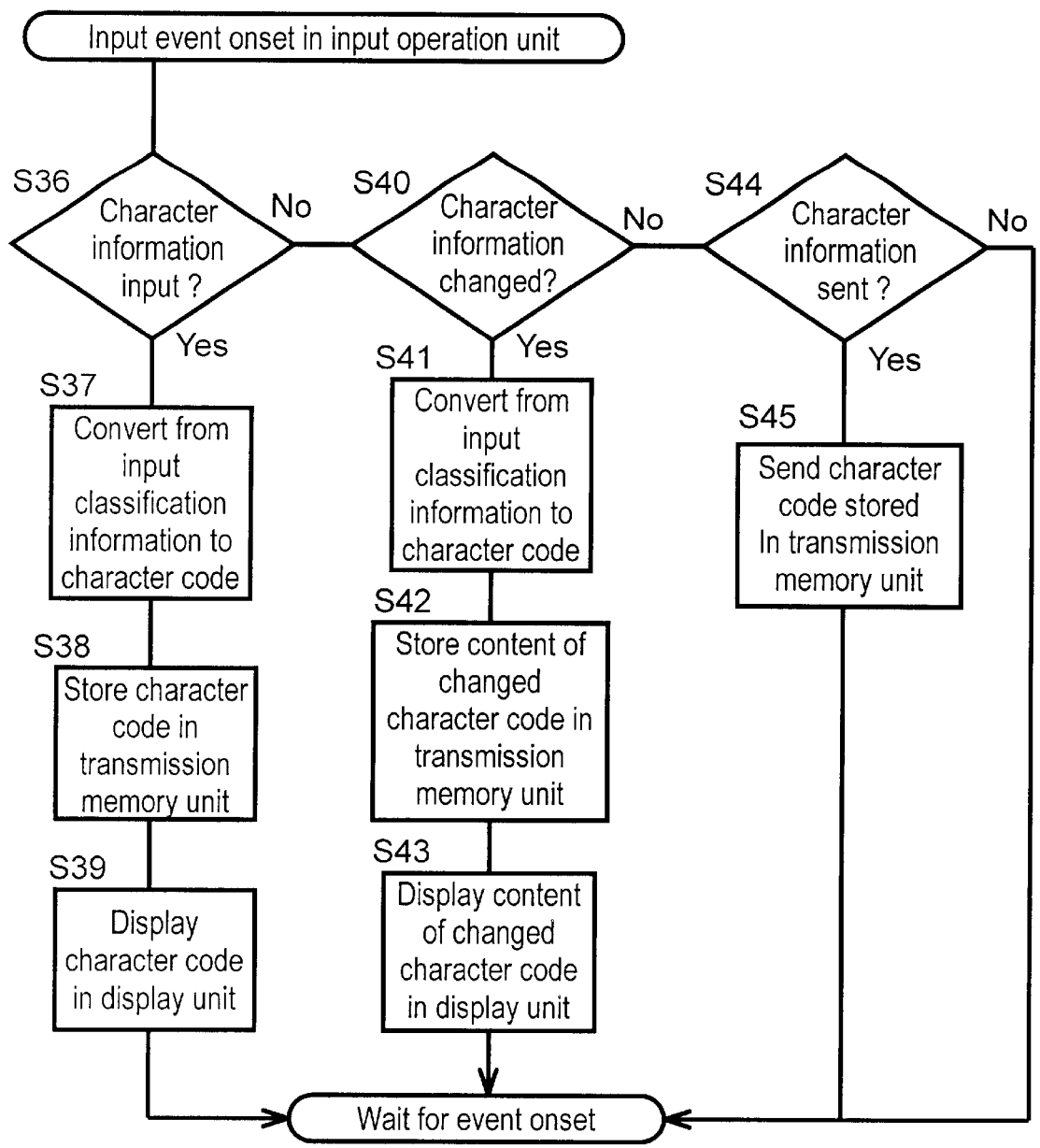
FIG. 11 is a flowchart showing an operation example of transmitted character information change in call or data communication enable state of the wireless telephone apparatus in the fifth embodiment of the invention.

FIG. 10 is a block diagram composing a wireless telephone apparatus in a fifth embodiment of the invention, and FIG. 11 is a flowchart showing an operation example of transmitted character information change in call or data communication enable state of the wireless telephone apparatus in the fifth embodiment of the invention.

The operation of the wireless telephone apparatus in call or data communication enable state for changing communication character information is described below by reference to FIG. 10 and FIG. 11. With the wireless telephone apparatus 1 being set in call enable state or data communication enable state, when an input is entered from the input operation unit 6 of the wireless telephone apparatus 1, the control unit 4 of the invention generates an input event (this event includes input classification information) of the input operation unit 6 showing that an input is made to the input operation unit 6 of the wireless telephone apparatus 1. The transmission/reception control means 4a of the control unit 4 of the invention judges to be an event of the transmission processor 4c of the control unit 4 of the invention, when the input classification information of the generated input event of the input operation unit 6 is character information input (S36), the input classification information of the input event of the input operation unit 6 is converted to character code (S37), this character code is stored in a transmission memory unit 9 (S38), and the character code is displayed in the display unit 5 (S39), thereby waiting for event onset. When the input classification information of the generated input event of the input operation unit 6 is character information change (S40), the character code is changed (S41), and the content of the changed character code is stored in the transmission memory unit 9 (S42), and the content of the changed character code is displayed in the display unit 5 (S43), thereby waiting for event onset. When the input classification information of the generated input event of the input operation unit 6 is character information transmission (S44), the transmission character code data stored in the transmission memory unit 9 is transmitted through the wireless means 3a and data communication means 3c of the wireless unit 3 (S44), thereby waiting for event onset.

(Sixth embodiment)

Figure 12:
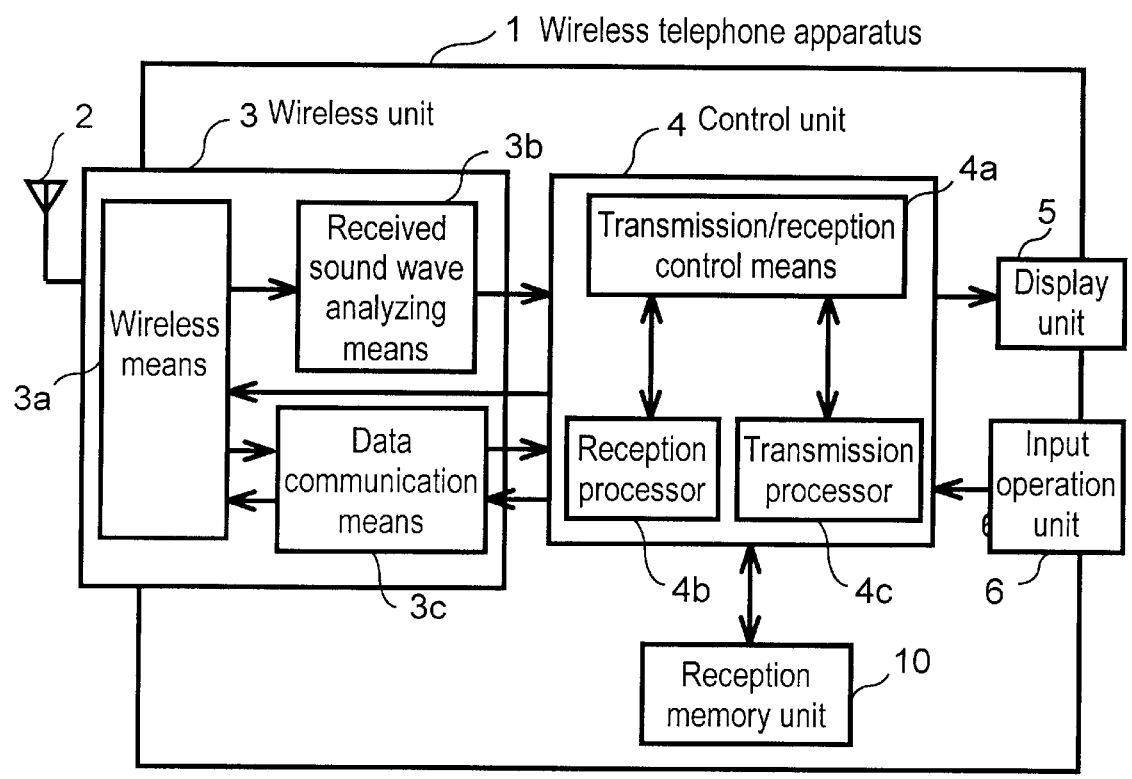
FIG. 12 is a block diagram composing a wireless telephone apparatus in a sixth embodiment of the invention.
Figure 13:
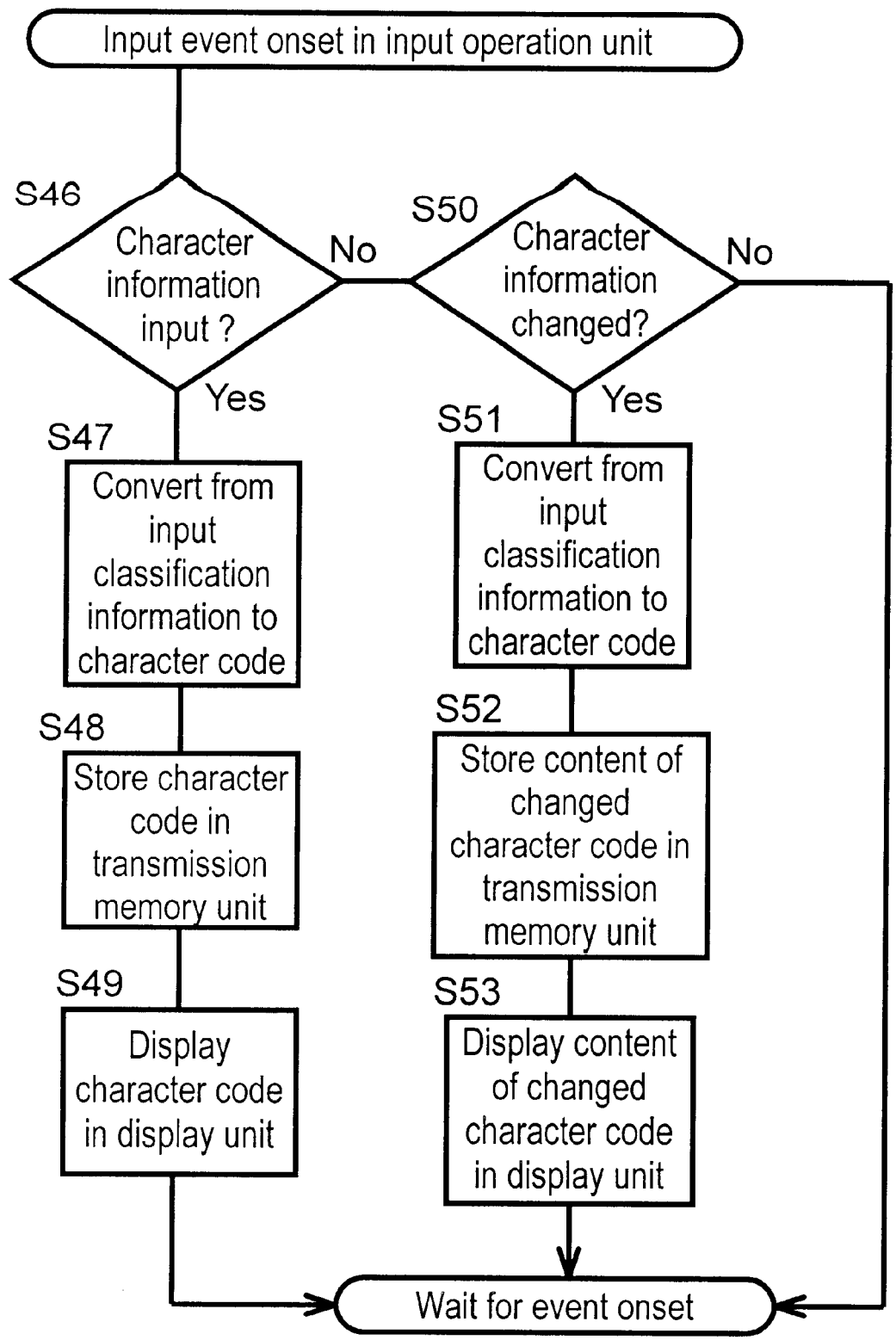
FIG. 13 is a flowchart showing an operation example of received character information change in call or data communication enable state of the wireless telephone apparatus in the sixth embodiment of the invention.

FIG. 12 is a block diagram composing a wireless telephone apparatus in a sixth embodiment of the invention, and FIG. 13 is a flowchart showing an operation example of received character information change in call or data communication enable state of the wireless telephone apparatus in the sixth embodiment of the invention.

The operation of the wireless telephone apparatus in call or data communication enable state for changing the character code obtained by converting the character information after reception is described below by reference to FIG. 12 and FIG. 13. With the wireless telephone apparatus 1 being set in call enable state, the character code obtained by changing after receiving wireless signal is displayed in the display unit 5, and the display character code is stored in a reception memory unit 10, and when the owner of the wireless telephone apparatus 1 judges it necessary to change the displayed character code, and an input is entered from the input operation unit 6 of the wireless telephone apparatus 1, the control unit 4 of the invention generates an input event (this event includes input classification information) of the input operation unit 6 showing that an input is made to the input operation unit 6 of the wireless telephone apparatus 1. When the input classification information of the generated input event of the input operation unit 6 is character information input (S46), the input classification information of the input event of the input operation unit 6 is converted to character code (S47), and this character code is stored in the reception memory unit 10 (S48), and the character code is displayed in the display unit 5 (S49), thereby waiting for event onset. When the input classification information of the generated input event of the input operation unit 6 is character information change (S50), the character code is changed (S51), the content of the changed character code is stored in the reception memory unit 10 (S52), the content of the changed character code is displayed in the display unit 5 (S53), thereby waiting for event onset.

(Seventh embodiment)

Figure 14:
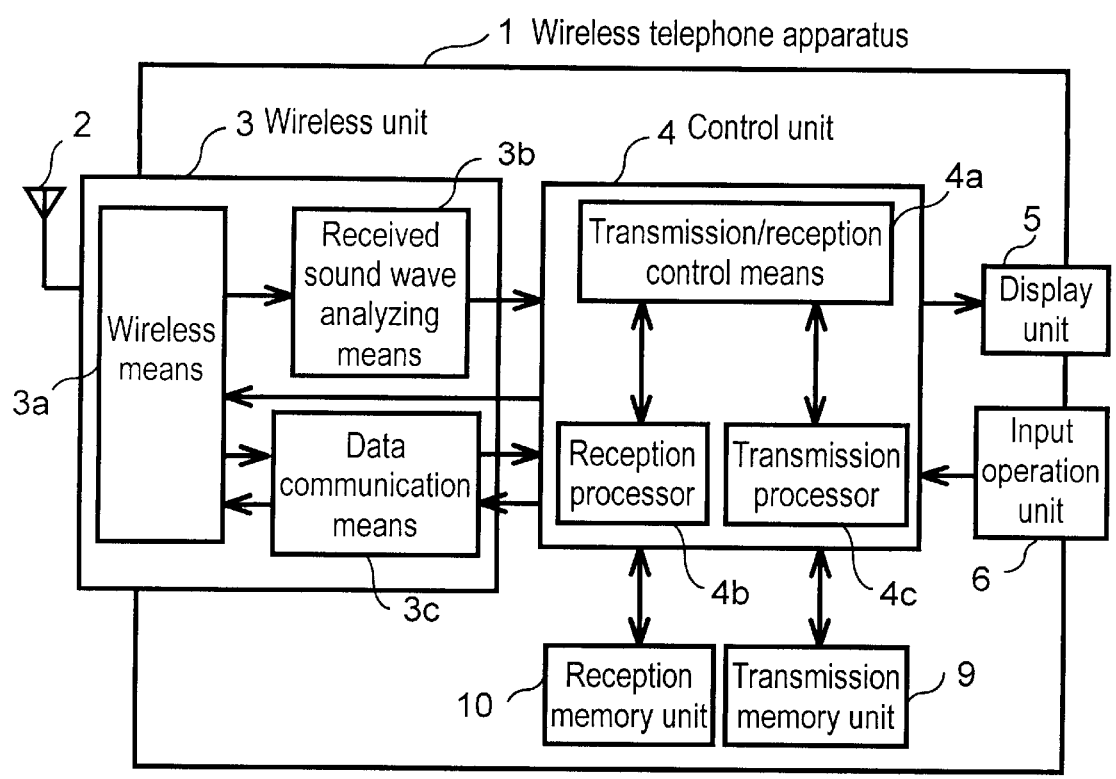
FIG. 14 is a block diagram composing a wireless telephone apparatus in a seventh embodiment of the invention.
Figure 15:
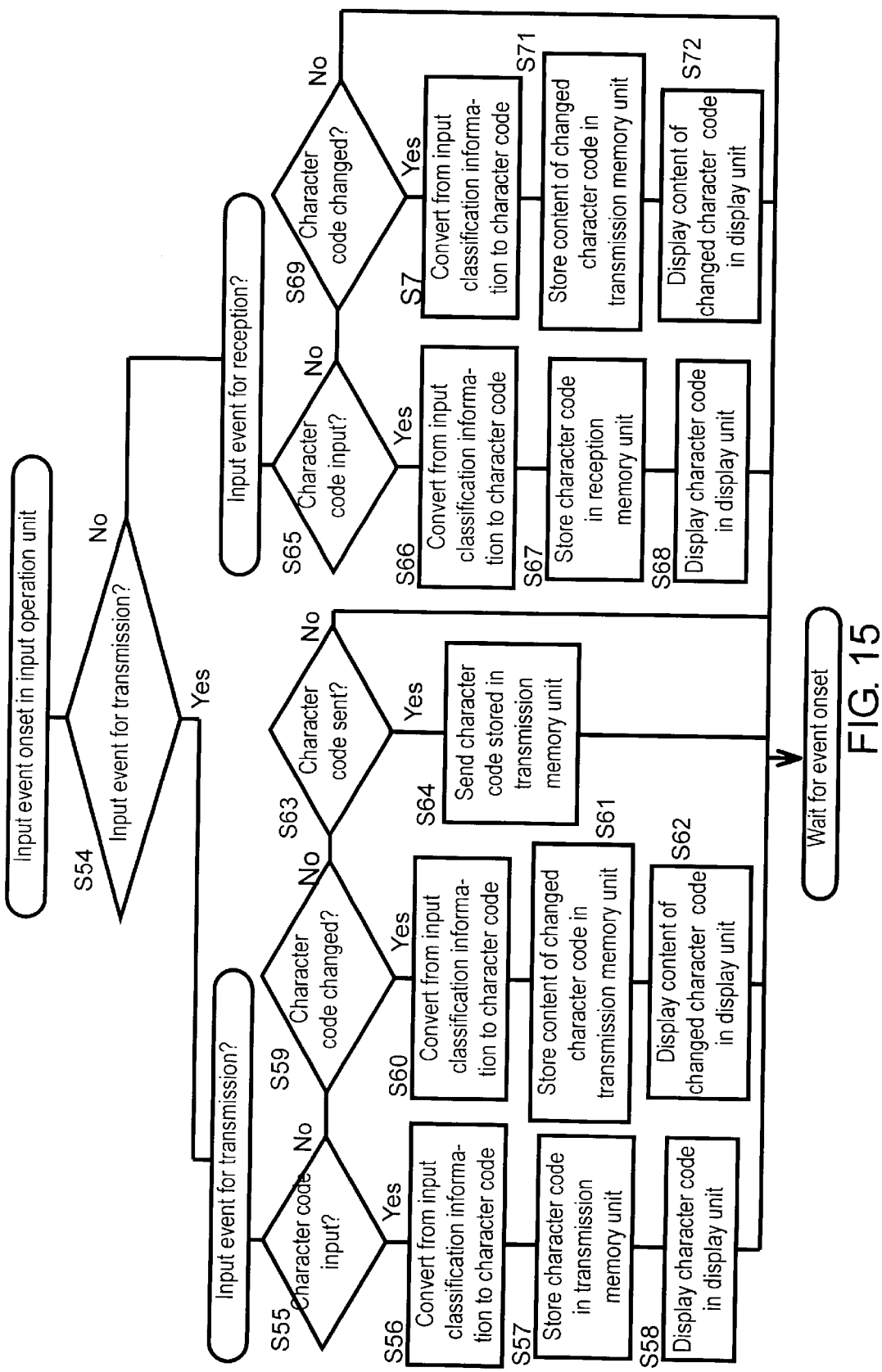
FIG. 15 is a flowchart showing an operation example of transmitted or received character information change in call or data communication enable state of the wireless telephone apparatus in the seventh embodiment of the invention.

FIG. 14 is a block diagram composing a wireless telephone apparatus in a seventh embodiment of the invention, and FIG. 15 is a flowchart showing an operation example of transmitted or received character information change in call or data communication enable state of the wireless telephone apparatus in the seventh embodiment of the invention.

The operation of the wireless telephone apparatus in call or data communication enable state for changing the transmission or reception character information is described below by reference to FIG. 14 and FIG. 15. With the wireless telephone apparatus 1 being set in call and data communication enable state, when an input is entered to the stored character information for transmission from the input operation unit 6 of the wireless telephone apparatus 1, the control unit 4 of the invention generates an input event (this event includes input classification information) of the input operation unit 6 showing that an input is made to the input operation unit 6 of the wireless telephone apparatus 1. The transmission/reception control means of the control unit 4 of the invention judges that the input event of the input operation unit 6 is an input event for transmission (S54), and when the input event of the input operation unit 6 is judged to be an input event for transmission and the input classification information of the input event for transmission is character code input (S55), the input classification information of the input event of the input operation unit 6 is converted to character code (S56), and this character code is stored in the transmission memory unit 9 (S57), and the character code is displayed in the display unit 5 (S58), thereby waiting for event onset. When the input classification information of the input event for transmission is character code change (S59), the input classification information of the input event of the input operation unit 6 is converted to character code (S60), the content of the changed character code is stored in the transmission memory unit 9 (S61), the content of the changed character code is displayed in the display unit 5 (S62), thereby waiting for event onset. When the input classification information of the input event for transmission is character code transmission (S63), the transmission character code data stored in the transmission memory unit 9 is transmitted through the wireless means 3a and data communication means 3c of the wireless unit 3 (S64), thereby waiting for event onsets. When an input is entered to the stored character information for reception from the input operation unit 6 of the wireless telephone apparatus 1, the control unit 4 of the invention generates an input event (this event includes input classification information) of the input operation unit showing that an input is made to the input operation unit 6 of the wireless telephone apparatus 1. The transmission/reception control means 4a of the control unit 4 of the invention judges whether the generated input event of the input operation unit 6 is an input event for reception (S54), and the input event of the input operation unit 6 is judged to be an input event for reception, and when the generated input event of the input operation unit 6 is the input event for reception, and the input classification information of the input event for reception is character code input (S65), the input classification information of the input event of the input operation unit 6 is converted to character code (S66), and this character code is stored in the reception memory unit 10 (S67), and the character code is displayed in the display unit 5 (S68), thereby waiting for event onset. When the input classification information of the input event for reception is character code change (S69), the input classification information is converted to character code (S70), the content of the changed character code is stored in the reception memory unit 10 (S71), the content of the changed character code is displayed in the display unit 5 (S72), thereby waiting for event onset.

Communication by characters as in the invention is very useful allowing telephone like conversation between those impaired in hearing or speaking.

In daily life, wherever loud speaking is not allowed (such as in the library or in the train), it is very convenient because conversation is achieved without using voice.

As mentioned above, two-way communication by "characters" is very effective, and the invention also includes methods of communication by "video" data instead of characters, and sending and receiving both "character" and "video" data.

The video communication can be recognized more directly and visually than character communication, and is effective for transmitting information.

However, the video data tends to be larger in data quantity as compared with the character data communication. Accordingly, it takes longer time in communication and hence higher call charges, and the call interruption time is extended due to long data transfer time, and smooth talking is disabled.

In such a case, by compressing by data compressing means when transferring data, and expanding the compressed information at the receiving side, the quantity of communication data is smaller, and hence the call time is shortened, the call charge is reduced, and the call interruption time is minimized.

In addition, as mentioned above, by transmitting the character data information together with the video data, the character data can be utilized as supplement to the video information, and the transmission charge of video information can be substantially decreased. Moreover, since the supplementary explanation of the video data is added, the content of the image can be easily understood by the partner.

What is claimed is:

1. A wireless telephone apparatus comprising:
   wireless communication means for bi-directional communication of character data and spoken data with a remote telephone apparatus through a wireless base station,
   input means for entering said character data,
   first data display means for displaying the character data transmitted,
   second data display means for displaying the character data received
   data communication means for bi-directional communication of the character data and the spoken data with said wireless communication means,
   a control unit for controlling said data communication means during a wireless call through said wireless communication means, the control unit controlling both transmission of the character data and the spoken data entered through said input means and reception of the character data and the spoken data transmitted from the remote telephone apparatus through said data communication means, said control unit determining an input event and a reception event of said wireless telephone apparatus, in determining an input event said control unit sending the character data to said first data display means and the character data and the spoken data being sent simultaneously to said data communication means, and in determining a reception event said control unit receiving data from said data communication means and sending character to said second data display means when said data is recognized as character data.

2. A wireless telephone apparatus of claim 1,
   wherein said data communication means communicates data by converting the information entered through the input means into a tone signal and sending to the wireless communication means, and converting the tone signal received through said wireless communication means into data.

3. A wireless telephone apparatus of claim 2,
   wherein said data communication means sends and receives DTMF signal as tone signal.

4. A wireless telephone apparatus of claim 1,
   wherein said data communication means communicates data by sending the digital information entered through the input means to the wireless communication means as digital signal, and delivering the digital signal received through the wireless communication means.

5. A wireless telephone apparatus of claim 4,
   wherein digital communication of said data communication means conforms to the data transmission system of PIAFS (Personal Handyphone Internet Access Forum).

6. A wireless telephone apparatus of claim 1,
   wherein said data communication means includes first communication means for communicating data by converting the information entered through the input means into a tone signal and sending to the wireless communication means, and converting the tone signal received through said wireless communication means into data, and
   second communication means for communicating data by sending the digital information entered through the input means to the wireless communication means as digital signal, and delivering the digital signal received through the wireless communication means, thereby communicating data by utilizing either communication means.

7. A wireless telephone apparatus of claim 6,
   wherein said data communication means sends and receives DTMF signal as tone signal.

8. A wireless telephone apparatus of claim 6,
   wherein digital communication of said data communication means conforms to the data transmission system of PIAFS (Personal Handyphone Internet Access Forum).

9. A wireless telephone apparatus of claim 1,
   wherein said data communication means communicates data by converting the information entered through the input means into a tone signal and sending to the wireless communication means, and converting the tone signal received through said wireless communication means into data.

10. A wireless telephone apparatus of claim 9,
    wherein said data communication means sends and receives DTMF signal as tone signal.

11. A wireless telephone apparatus of claim 1,
    wherein said data communication means communicates data by sending the digital information entered through the input means to the wireless communication means as digital signal, and delivering the digital signal received through the wireless communication means.

12. A wireless telephone apparatus of claim 11,
    wherein digital communication of said data communication means conforms to the data transmission system of PIAFS (Personal Handyphone Internet Access Forum).

13. A wireless telephone apparatus of claim 1,
    wherein said data communication means includes first communication means for communicating data by converting the information entered through the input means into a tone signal and sending to the wireless communication means, and converting the tone signal received through said wireless communication means into data, and
    second communication means for communicating data by sending the digital information entered through the input means to the wireless communication means as digital signal, and delivering the digital signal received through the wireless communication means, thereby communicating data by utilizing either communication means.

14. A wireless telephone apparatus of claim 13,
wherein said data communication means sends and receives DTMF signal as tone signal.

15. A wireless telephone apparatus of claim 14,
wherein digital communication of said data communication means conforms to the data transmission system of PIAFS (Personal Handyphone Internet Access Forum).

16. A wireless telephone apparatus of claim 1,
wherein the information entered through said input means is video data.

17. A wireless telephone apparatus of claim 16,
wherein said data communication means communicates data by converting the information entered through the input means into a tone signal and sending to the wireless communication means, and converting the tone signal received through said wireless communication means into data.

18. A wireless telephone apparatus of claim 17,
wherein said data communication means sends and receives DTMF signal as tone signal.

19. A wireless telephone apparatus of claim 16,
wherein said data communication means communicates data by sending the digital information entered through the input means to the wireless communication means as digital signal, and delivering the digital signal received through the wireless communication means.

20. A wireless telephone apparatus of claim 19,
wherein digital communication of said data communication means conforms to the data transmission system of PIAFS (Personal Handyphone Internet Access Forum).

21. A wireless telephone apparatus of claim 16,
wherein said data communication means includes first communication means for communicating data by converting the information entered through the input means into a tone signal and sending to the wireless communication means, and converting the tone signal received through said wireless communication means into data, and
second communication means for communicating data by sending the digital information entered through the input means to the wireless communication means as digital signal, and delivering the digital signal received through the wireless communication means, thereby communicating data by utilizing either communication means.

22. A wireless telephone apparatus of claim 21,
wherein said data communication means sends and receives DTMF signal as tone signal.

23. A wireless telephone apparatus of claim 21,
wherein digital communication of said data communication means conforms to the data transmission system of PIAFS (Personal Handyphone Internet Access Forum).

24. A wireless telephone apparatus of claim 1,
wherein said data display means also displays the information entered from said input means.

25. A wireless telephone apparatus of claim 1, further comprising:
memory means for storing the data entered from said input means and the data received by said data communications means,
wherein said input means can instruct data reading or data conversion in accordance with input classification information of the contents of the memory unit, and
said control unit displays the data being read out by the instruction from said input means in said first display means, converts the data according to the input classification information when the instruction of the read information is made through said input means, and transmits the converted data through said data communication unit and said wireless communication unit.

26. A wireless telephone apparatus of claim 25,
wherein the information stored in said memory means is controlled and displayed in said first or second display unit.

27. A wireless telephone apparatus of claim 1, further comprising:
memory means for storing the data entered from said input means and the data received by said data communication means,
wherein said input means can instruct data reading or data conversion in accordance with input classification information of the contents of the memory unit, and
said control unit displays the data being read out by the instruction from said input means in said second display means, converts the content of data according to the input classification information when the instruction of the read information is made through said input means, and stores the converted data in said memory means.

28. A wireless telephone apparatus of claim 27,
wherein the information stored in said memory means is controlled and displayed in said first display unit.

29. A wireless telephone apparatus of claim 1,
wherein said input means can also enter the instruction for changing over sound communication and data communication, and
said control unit controls to change over to communication by said data communication means when changeover to data communication is instructed from said input means during sound communication by the wireless communication means, and change over to sound communication by said wireless communication means when changeover to said sound communication is instructed while communicating through said data communication means.

30. A wireless telephone apparatus according to claim 1, wherein said controller converts said input data and said wireless data to character data if said input data and said wireless data correspond to character data.

* * * * *